(12) United States Patent
Ariyur

(10) Patent No.: US 7,899,483 B2
(45) Date of Patent: Mar. 1, 2011

(54) METHOD AND SYSTEM FOR PERFORMING DISTRIBUTED OUTER LOOP POWER CONTROL IN WIRELESS COMMUNICATION NETWORKS

(75) Inventor: Kartik B. Ariyur, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 769 days.

(21) Appl. No.: 11/868,804

(22) Filed: Oct. 8, 2007

(65) Prior Publication Data
US 2009/0093267 A1    Apr. 9, 2009

(51) Int. Cl.
*H04B 7/00*    (2006.01)
(52) U.S. Cl. ...................................................... 455/522
(58) Field of Classification Search ........................ None
See application file for complete search history.

(56) References Cited

U.S. PATENT DOCUMENTS

| | | | |
|---|---|---|---|
| 5,333,175 A * | 7/1994 | Ariyavisitakul et al. ..... | 455/423 |
| 5,596,722 A | 1/1997 | Rahnema | |
| 5,930,684 A | 7/1999 | Keskitalo et al. | |
| 6,259,927 B1 | 7/2001 | Butovitsch et al. | |
| 6,442,615 B1 | 8/2002 | Nordenstam et al. | |
| 6,606,303 B1 | 8/2003 | Hassel et al. | |
| 6,778,839 B2 | 8/2004 | Valkealahti | |
| 6,795,865 B1 | 9/2004 | Bahl et al. | |
| 6,829,222 B2 | 12/2004 | Amis et al. | |
| 6,836,463 B2 | 12/2004 | Garcia-Luna-Aceves et al. | |
| 6,917,985 B2 | 7/2005 | Madruga et al. | |
| 6,931,257 B2 | 8/2005 | Shahidi et al. | |
| 6,961,310 B2 | 11/2005 | Cain | |
| 6,963,747 B1 | 11/2005 | Elliott | |
| 6,968,201 B1 | 11/2005 | Gandhi et al. | |
| 7,016,306 B2 | 3/2006 | Alapuranen et al. | |
| 7,027,402 B2 | 4/2006 | Hedden | |
| 7,035,221 B2 | 4/2006 | Furukawa et al. | |

(Continued)

OTHER PUBLICATIONS

Scherber et al., "Distributed Computation of Averages Over AD HOC Networks", "IEEE Journal on Selected Areas in Communications", Apr. 2005, pp. 776-787, vol. 23, No. 4, Publisher: IEEE, Published in: US.

(Continued)

*Primary Examiner*—Matthew D. Anderson
*Assistant Examiner*—Gennadiy Tsvey
(74) *Attorney, Agent, or Firm*—Fogg & Powers LLC

(57) ABSTRACT

A method and system for performing distributed outer loop power control in a wireless communication network are disclosed. The method includes the steps of determining a transmit power for a plurality of transmitting nodes such that signals sent from each of the transmitting nodes are received at a receiver associated with a receiving node at a predetermined signal-to-interference plus noise ratio (SINR) set point, increasing the SINR at the receiving node of one or more transmitting nodes of the plurality of transmitting nodes if a saturation value for a front end of the receiver associated with the receiving node is not near a predetermined saturation value, and decreasing the SINR at the receiving node of the one or more transmitting nodes of the plurality of transmitting nodes if the saturation value for the front end of the receiver associated with the receiving node is near the predetermined saturation value.

20 Claims, 2 Drawing Sheets

U.S. PATENT DOCUMENTS

| | | |
|---|---|---|
| 7,085,290 B2 | 8/2006 | Cain et al. |
| 7,111,074 B2 | 9/2006 | Basturk |
| 7,159,035 B2 | 1/2007 | Garcie-Luna-Aceves et al. |
| 7,225,268 B2 | 5/2007 | Watanabe |
| 7,266,386 B2 | 9/2007 | Kim et al. |
| 7,280,483 B2 | 10/2007 | Joshi |
| 7,295,856 B2 | 11/2007 | Agin |
| 7,333,827 B2 | 2/2008 | Biddiscombe et al. |
| 7,339,994 B2 | 3/2008 | Lin et al. |
| 7,340,268 B2 | 3/2008 | Oh et al. |
| 7,342,907 B2 | 3/2008 | Kim et al. |
| 2002/0105937 A1 | 8/2002 | Takeuchi et al. |
| 2002/0173309 A1 | 11/2002 | Shahidi et al. |
| 2002/0196802 A1 | 12/2002 | Sakov et al. |
| 2003/0033350 A1 | 2/2003 | Arimilli et al. |
| 2003/0045318 A1 | 3/2003 | Subrahmanya |
| 2003/0083082 A1* | 5/2003 | Lundby ............... 455/501 |
| 2003/0163554 A1 | 8/2003 | Sendrowicz |
| 2004/0052210 A1 | 3/2004 | Kasera et al. |
| 2004/0073701 A1 | 4/2004 | Huang et al. |
| 2004/0142692 A1 | 7/2004 | Schwarz et al. |
| 2004/0146007 A1 | 7/2004 | Saadawi et al. |
| 2004/0209635 A1* | 10/2004 | Hsu et al. ............. 455/522 |
| 2005/0050220 A1 | 3/2005 | Rouyer et al. |
| 2005/0053005 A1 | 3/2005 | Cain et al. |
| 2005/0136961 A1 | 6/2005 | Simonsson et al. |
| 2005/0143012 A1 | 6/2005 | Gu et al. |
| 2006/0040696 A1 | 2/2006 | Lin |
| 2006/0092870 A1 | 5/2006 | Kondou et al. |
| 2006/0160555 A1 | 7/2006 | Kobayashi et al. |
| 2006/0183495 A1* | 8/2006 | Soliman ............... 455/522 |
| 2007/0105581 A1* | 5/2007 | Ariyur ................. 455/522 |
| 2008/0032733 A1* | 2/2008 | Hays ..................... 455/522 |
| 2009/0069057 A1 | 3/2009 | Haartsen et al. |

OTHER PUBLICATIONS

Varadarajan et al., "Analytic Framework and QOS Adaptive Mechanisms for Achieving Transport Capacity Bounds in Multi-Hop Statically Routed IE", "First Annual Conference of ITA (ACITA)", 2007, Publisher: Honeywell Aerospace Advanced Technology Labs, Published in: Minneapolis, MN.

* cited by examiner

METHOD AND SYSTEM FOR PERFORMING DISTRIBUTED OUTER LOOP POWER CONTROL IN WIRELESS COMMUNICATION NETWORKS

RELATED APPLICATIONS

The present application is related to commonly assigned and co-pending U.S. patent application Ser. No. 11/269,383 entitled "SYSTEM AND METHOD TO PERFORM STABLE DISTRIBUTED POWER CONTROL IN A WIRELESS NETWORK", filed on Nov. 8, 2005, and U.S. patent application Ser. No. 11/841,364 entitled "METHOD FOR ADJUSTING POWER AT A NODE", filed on Aug. 20, 2007, each of which is incorporated herein by reference in its entirety.

FIELD OF THE INVENTION

The invention is related to the telecommunications field, and more particularly, but not exclusively, to a method and system for performing distributed outer loop power control in wireless communication networks.

BACKGROUND OF THE INVENTION

In many existing wireless communication systems, such as for example, certain cellular communication systems, the transmit power levels from the mobile units to the base station of the systems are controlled. For example, in some multiple-access systems utilizing spread spectrum technology, power is controlled at each mobile unit in order to reduce interference caused by the transmissions of each mobile unit on the transmissions of the other mobile units using the same channel. Controlling the transmit power also helps to reduce power consumption at the mobile units, which are typically battery powered. Essentially, the transmission power of each mobile unit is set high enough so that signals are received at the base station at a desired Signal-to-Interference plus Noise Ratio (SINR), but low enough to meet the above-described goals of reduced interference and power consumption.

In order to determine the transmission power of each mobile unit, a SINR set point is established for the system involved. Generally, the SINR set point is based on the minimum data rate required by the system. In wireless communications, the maximum data rate of transmission between two mobile units is directly proportional to the SINR between the two units. A relatively low SINR limits the maximum data rate, because data received with a low signal-to-noise ratio requires a large amount of processing to extract the transmitted signal from the received waveform. Conversely, a relatively high SINR enables a high transmission data rate, because only a small amount of processing is required to extract the transmitted signal from the received waveform. Therefore, when a system establishes its SINR set point, the data rate required for proper throughput is determined and a minimum SINR is established to achieve the required data rate. A system SINR set point is then set at or slightly above this minimum SINR value. In many of the systems involved, the system set point is modified over time to account for changes in the number of users in the system and/or environmental phenomena.

Once a system's SINR set point is determined, the transmit power level for each mobile unit can be established so that a signal sent from a mobile unit is received by the base station at the SINR set point. Typically, this function is accomplished through feedback from the base station to each mobile unit regarding that mobile unit's received SINR. For example, when a mobile unit transmits a signal to the base station, the base station measures the SINR of the signal and either notifies the mobile unit of its SINR or directly commands the mobile unit to adjust its transmission power. In either case, the mobile unit sets its transmission power so that signals are received at the SINR set point. Different mobile units may be located at different distances from the base station. Consequently, different mobile units may transmit at different power levels in order to achieve the established SINR set point.

Generally, each mobile unit transmits at the minimum power level needed to achieve the SINR set point. This approach minimizes the amount of interference caused by each mobile unit on the signals of other mobile units. Also, by having the mobile units transmit at the minimum power level, the users of the mobile units can obtain the maximum usage (e.g., talk time, etc.) from their battery powered mobile units.

In certain wireless communication networks, such as for example, wireless cellular networks using Direct-Sequence Spread Spectrum (DSSS) modulation techniques, two types of power control are used to maintain system performance: (1) inner loop power control is used to ensure that all of the radio transceivers in the network can obtain links of similar quality; and (2) outer loop power control is used to degrade performance systematically when the network becomes overloaded. The existing power control techniques are suitable if the radio transceivers being used in a network have similar (or identical) operating characteristics or functions, such as for example, cellular phones or Blackberry wireless devices. However, a significant problem with the existing power control techniques is that there is no systematic technique currently available that can exploit the advantages of today's wireless radio transceivers that have different receive antenna saturation levels, different transmit power limits, and/or are capable of adjusting to wide variations in traffic (e.g., in military wireless networks). Therefore, a pressing need exists for a power control technique that can be used to exploit the technological advantages of existing (and future) wireless radio transceivers, and resolve the above-described problems and other related problems.

SUMMARY OF THE INVENTION

In a first example embodiment, a method for performing distributed outer loop power control in a wireless communication network is provided. The method includes the steps of determining a transmit power for a plurality of transmitting nodes such that signals sent from each of the transmitting nodes are received at a receiver associated with a receiving node at a predetermined signal-to-interference plus noise ratio (SINR) set point, increasing the SINR at the receiving node of one or more transmitting nodes of the plurality of transmitting nodes if a saturation value for a front end of the receiver associated with the receiving node is not near a predetermined saturation value, and decreasing the SINR at the receiving node of the one or more transmitting nodes of the plurality of transmitting nodes if the saturation value for the front end of the receiver associated with the receiving node is near the predetermined saturation value.

In a second example embodiment, a method for performing distributed outer loop power control in a cellular communication network is provided. The method includes the steps of determining a transmit power for a plurality of mobile units such that signals sent from each of the mobile units are received at a receiver associated with a base station at a predetermined signal-to-interference plus noise ratio (SINR)

set point, increasing the SINR at the base station receiver of one or more of the mobile units if a saturation value for a front end of the base station receiver is not near a predetermined value, and decreasing the SINR at the base station receiver if the saturation value for the front end of the base station receiver is near the predetermined saturation value.

In a third example embodiment, a wireless communication system is provided. The system includes a plurality of nodes including at least one receiving node and a plurality of transmitting nodes, each transmitting node of the plurality of transmitting nodes communicatively coupled to the at least one receiving node. The at least one receiving node is configured to receive a signal transmitted by at least one transmitting node of the plurality of transmitting nodes, and the at least one transmitting node of the plurality of transmitting nodes is configured to determine a transmit power such that signals sent from the at least one transmitting node is received at the at least one receiving node at a predetermined SINR set point (e.g., using power control algorithm disclosed in U.S. patent application Ser. No. 11/269,383), increase an SINR at the at least one receiving node if a saturation value for a front end of a receiver associated with the at least one receiving node is not near a predetermined saturation value, and decrease the SINR at the at least one receiving node if the saturation value for the front end of the receiver associated with the at least one receiving node is near the predetermined saturation value.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT(S)

The present invention provides a method and system for performing distributed outer loop power control in wireless communication networks. Essentially, the present invention provides a distributed outer loop power control technique that resolves problems related primarily, but not exclusively, to receive signal saturation. For example, in certain wireless networks, each radio transceiver has a certain received signal level at which its front end (e.g., antennas, filters, etc.) becomes saturated. Consequently, it would be advantageous to impose a constraint on the existing wireless network power control techniques in order to avoid this saturation level. In this regard, the present invention provides a method and system for performing distributed outer loop power control that can be used to reduce frame error set points or SINR set points in a wireless communication network if there is an increase in the overall level of the signals received at a receiver, and/or uniformly or systematically degrade the performance of pertinent links in the network if there is an increase in the interference or traffic observed at a receiver. For example, the present invention enables a wireless network to handle sudden recoveries from deep fades. Also, the present invention enables a network to uniformly degrade the performance of its links if, for example, there are numerous radio transmitters communicating with a single radio receiver.

Figure 1:
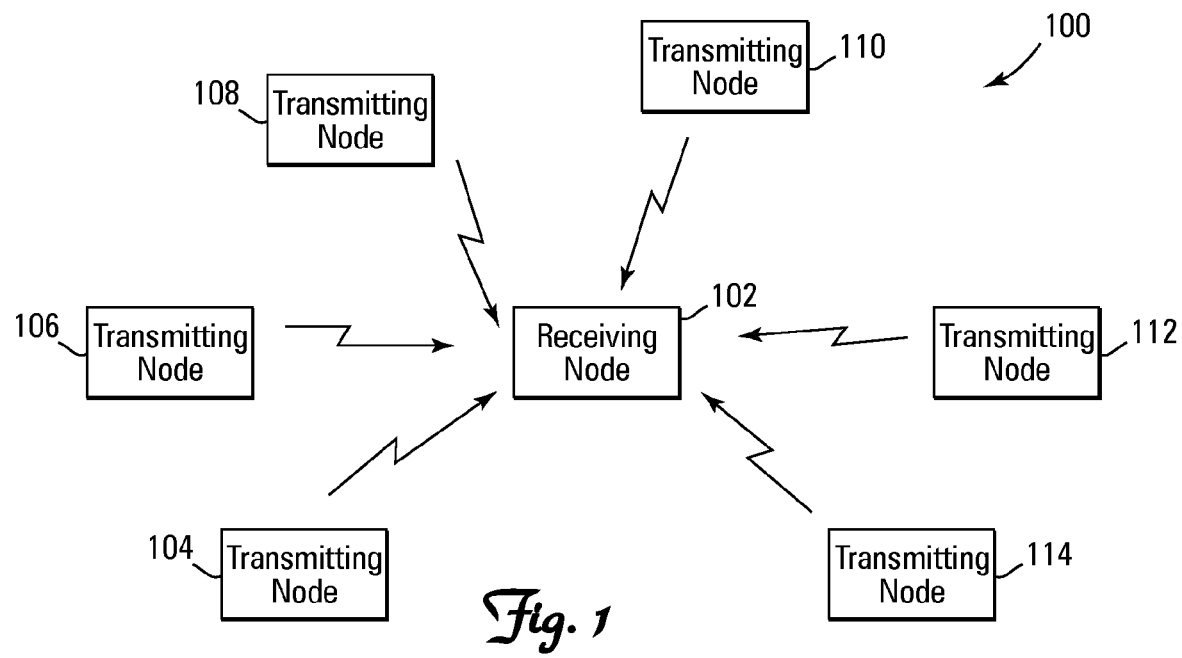
FIG. 1 depicts a block diagram of an example wireless communication network, which can be used to implement one or more example embodiments of the present invention.

With reference now to the figures, FIG. 1 depicts a block diagram of an example wireless communication network 100, which can be used to implement one or more example embodiments of the present invention. For example, network 100 can be used to implement a wireless communication network in which one or more methods for performing distributed outer loop power control can be used. As such, for some example embodiments, network 100 can be a one-hop network that includes a plurality of nodes 102, 104, 106, 108, 110, 112 and 114. Note that although seven nodes are shown, the number of nodes actually implemented in a particular wireless network is primarily a design choice, and the present invention is not intended to be limited to a specific number or type of nodes. For example, in some embodiments, less than seven nodes may be used in a suitable wireless communication network. In other embodiments, more than seven nodes may be used.

For the illustrative embodiments shown, each of nodes 102 through 114 is capable of generating, transmitting and/or receiving information for/to/from the other nodes. In some embodiments, nodes 102 through 114 can be mobile. In other embodiments, these nodes can be fixed. In yet other embodiments, these nodes can be composed of a combination of fixed and mobile nodes. For illustrative purposes, in the example embodiments shown, it may be assumed that nodes 102 through 114 are wireless radio transceivers that are substantially similar in function and design. Also, it may be assumed that each node 102 through 114 is capable of transmitting to and receiving from any other node that is within a suitable range. Furthermore, although nodes 102 through 114 are capable of bi-directional communications between any two nodes, for illustrative purposes, one-way communication from each of nodes 104 through 114 to node 102 is shown. Therefore, for the example embodiments shown, node 102 is illustrated as a receiving node, and is currently receiving signals from the other nodes that are illustrated as transmitting nodes.

For at least one embodiment, network 100 can be a one-hop network, and nodes 104 through 114 can communicate data by transmitting a signal to node 102, and the data may be accompanied by an address of the destination node. For example, if node 104 intends to send a message to node 102, node 104 can transmit the message accompanied by data that indicates node 102 is the intended destination node for the message. Each node that is located within a suitable range of the transmitting node 104 can receive the signal sent by the transmitting node, and then process at least the destination data to determine if it is the intended destination node for that signal. Thus, in the illustrative embodiments depicted in FIG. 1, since it is assumed that node 102 is the intended destination node, node 102 can decode the received message, and the other nodes 106, 108, 110, 112 and 114 receiving the signal can recognize that they are not the intended destination node(s) and ignore the message(s) involved.

Note that although network 100 is preferably a wireless communication network in some example embodiments, the present invention is not intended to be limited to a particular network type or configuration. For example, in some embodiments, network 100 may be a combination of wired and wireless networks. In other embodiments, a wireless network can be implemented, for example, for communications underwater using sound waves where similar principles may prevail. Also, for example, in some embodiments, network 100 may be implemented with a multi-hop network. Furthermore, in some embodiments, a receiving node (e.g., node 102) can function as the hub of network 100 by receiving and relaying communications from/to some or all of the other nodes 104 through 114. Moreover, in some embodiments, a receiving node (e.g., node 102) may also function as a network administrator and control and coordinate communications between the other nodes (e.g., nodes 104 through 114). In addition to controlling and coordinating communications, a receiving node (e.g., node 102) can also generate original information and be the final destination of information from other nodes (e.g., nodes 104 through 114).

For some example embodiments, one or more of nodes 102 through 114 can include sensors, and/or voice and/or video communications equipment. For example, the sensors can include video cameras, motion sensors, radars, microphones, and/or other types of sensing devices. Also, one or more of nodes 102 through 114 can be implemented with devices other than sensors, voice or video communications equipment. For example, in some embodiments, one node (e.g., node 102) can function as an access point, and one or more of the other nodes (e.g., nodes 104 through 114) can be implemented as personal computers. For some embodiments, one node (e.g., node 102) can function as a base station, and the other nodes (e.g., nodes 104 through 114) can function as mobile users (e.g., cellular radiotelephone transceivers, Blackberry devices, PDAs, etc.).

For at least one example embodiment, network 100 includes nodes 102 through 114 that can communicate using spread spectrum modulation techniques. For example, nodes 102 through 114 can communicate using DSSS in a relatively low frequency band (e.g., 100 MHz-500 MHz). As such, a Pulsed Ultra-Wide Band (UWB) or Code Division Multiple Access (CDMA) technique may be used. However, it should be understood that the present invention is not intended to be limited to a particular modulation technique and/or frequency band.

For the embodiments implemented using spread spectrum modulation or similar techniques, for example, each transmission from certain nodes (e.g., nodes 106 through 114) may be detected by a receiving node (e.g., node 102) as noise or interference if the receiving node is attempting to decode a message or signal from a particular other node (e.g., node 104). Thus, it may be assumed that the signals transmitted from a plurality of nodes can hinder the reception of signals by a receiving node, and these transmitted signals can also add a substantive amount of interference to any signal received by the receiving node.

Figure 2:
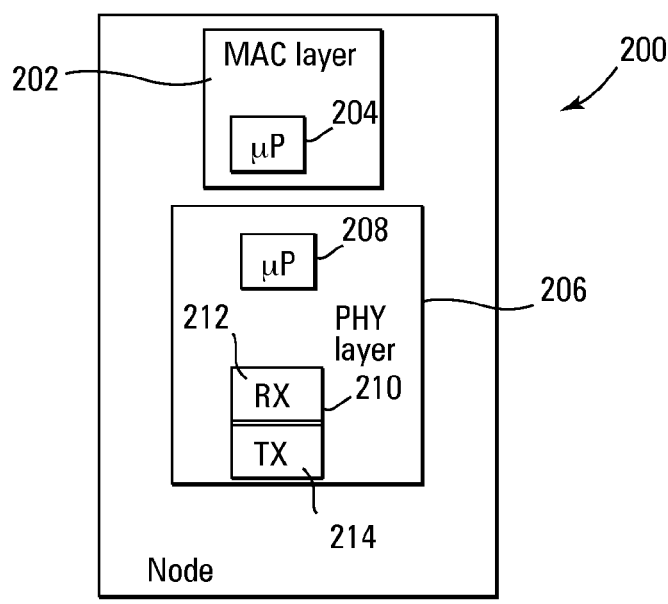
FIG. 2 is a block diagram depicting an example node for a wireless communication network, which can be used to implement one or more of the nodes shown for the example embodiments depicted in FIG. 1.

FIG. 2 is a block diagram depicting an example node 200 for a wireless communication network, which can be used to implement one or more of the nodes 102 through 114 shown for the example embodiments depicted in FIG. 1. For illustrative purposes and clarity, in at least one example embodiment, it may be assumed that each of the nodes 102 through 114 in FIG. 1 is similar in function and structure to the other nodes. For example, node 200 can function as a receiving node and/or a transmitting node, which includes a suitable Media Access Control (MAC) layer 202 and a processor unit 204 associated with the MAC layer 202. Also, exemplary node 200 includes a suitable Physical (PHY) layer 206 and a second processor unit 208 associated with the PHY layer 206. The PHY layer 206 also includes a transceiver 210 composed of a receiver section 212 and a transmitter section 214. Each processor unit 204, 208 can be implemented with a digital processor, such as for example, a microprocessor. Thus, node 200 is at least capable of transmitting and/or receiving wireless communication signals, and the associated processor unit 208 is at least capable of adjusting the data rate, redundancy and transmitted power levels of the signals involved. In any event, a more detailed description of exemplary functions and structures for such a node is disclosed in the above-described related U.S. patent application Ser. No. 11/269,383.

Figure 3:
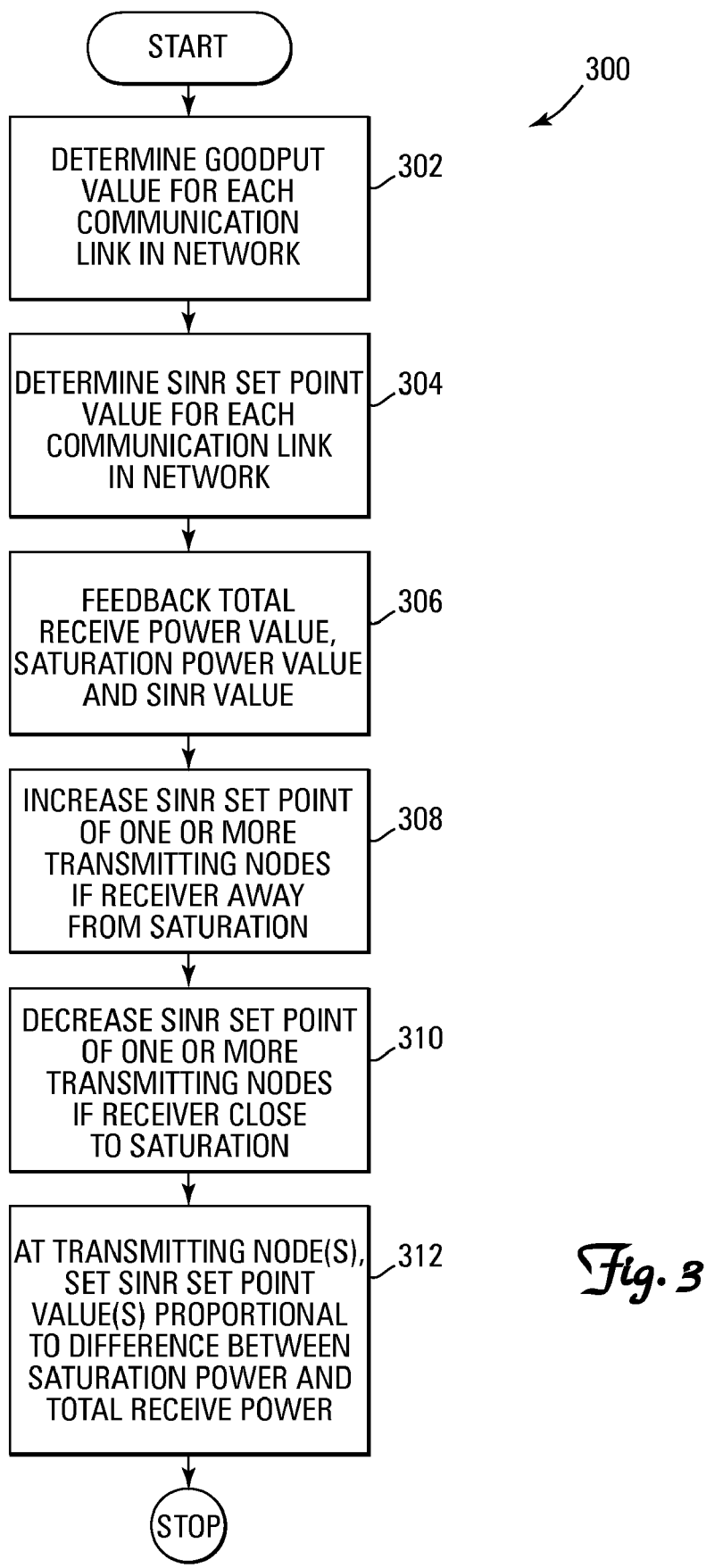
FIG. 3 is a flow chart depicting an example method for performing distributed outer loop power control in a wireless communication network, which can be used to implement one or more example embodiments of the present invention.

FIG. 3 is a flow chart depicting an example method 300 for performing distributed outer loop power control in a wireless communication network, which can be used to implement one or more example embodiments of the present invention. For example, method 300 can be used to perform distributed outer loop power control in wireless communication network 100 depicted in FIG. 1.

At this point, it is useful to describe the primary power control law disclosed in related U.S. patent application Ser. No. 11/269,383 ("the '383 Application"), which is:

$$P_{ij}(k+1) = \frac{SINR^*_{ij}}{SINR_{ij}(k)} P_{ij}(k)$$

where $P_{ij}$ represents the transmit power of a node i that is transmitting to another node j. The power control law expression, $P_{ij}$, assumes that the set points $SINR^*_{ij}$ are achievable, which is a valid assumption if the set points are set so that the power level of the received signal at a receiver does not saturate its front end. Essentially, this novel power control law enables a wireless communication network to vary its SINR set point (or transmitting nodes' power levels) within a relatively small range around predetermined settings that are known to avoid receiver saturation. In this regard, in the '383 Application, a receiving node sends a respective SINR value to each transmitting node. Consequently, using this novel approach to provide feedback associated with the saturation power of a receiver (with an adequate safety margin built in, for example, for transmitters coming out of a deep fade) along with its total received power (or, the difference between the two), the wireless communication networks involved can obtain a much larger range of data rates than prior networks, which also enables them to handle much wider variations in traffic. In any event, the pertinent details of this novel technique are disclosed in the '383 Application, which is incorporated herein by reference in its entirety.

It is also useful to describe the pertinent details of the novel techniques disclosed in related U.S. patent application Ser. No. 11/841,364 ("the '364 application"), which is also incorporated herein by reference in its entirety. Essentially, the '364 application provides a novel method for distributed power control in a wireless communication network, which determines a transmit power level for each transmitting node so that the level of the signals received at a receiving node is at a predetermined SINR set point. As such, the method disclosed in the '364 application provides a technique for adjusting the transmit power level of each transmitting node in a network, in order to provide signals at the desired SINR set point level at the receiving node involved. The '364 application presents inner loop power control, distributed in this case rather than centralized as is usually the case.

Returning now to method 300 in FIG. 3, and relying to some extent on the novel power control techniques disclosed in the '383 and '364 applications for some example embodiments, a first node (e.g., determining node) determines a goodput value for each communication link between itself and other nodes in the network involved (step 302). In this regard, the term "goodput" may be defined as the actual number of bits transported over a link per unit of time. For some embodiments, the determining node can be implemented with receiving node 102 shown in FIG. 1, and the other nodes can be implemented with transmitting nodes 104 through 114. In other embodiments, the determining node can be implemented, for example, as a base station in a wireless cellular communication network, and the other nodes can be implemented as mobile units, fixed units and/or a combination of the two.

Next, each transmitting node determines a set point value for the SINR of each pertinent link in the network based on the goodput values involved (step 304). The SINR set point can be determined by each transmitting node, using feedback about its SINR at the receiver, receiver saturation power, and total received power at the receiver (i.e., novel distribution of this computation). For example, on any given link between a receiving node and a transmitting node, the goodput value for the link is primarily a function of the SINR and the noise floor, and a set point for the SINR for a specific link can be determined that assures a predetermined goodput value, C (or, for example, a frame error rate (FER) value). For example, the SINR for a specific link can be expressed as:

$$SINR^*_{ij} = f(C^*_{ij})$$

This relationship can remain valid as long as the front end of the determining node's receiver does not become saturated.

Next, the determining node (e.g., receiving node) provides a suitable amount of feedback to one or more transmitting nodes about the total received power at its receiver $P_j^T$, the saturation power $P_j^{sat}$ of its receiver, and a suitable SINR value (step 306). For example, the feedback can be numbers that are periodically transmitted by the receiving node to a transmitting node to enable the transmitting node to adjust itself. Using this feedback information, for some example embodiments, the transmitting node executes a suitable power control law that can increase the SINR set point to provide the maximum capacity requested if the receiver's front end is sufficiently far away from saturation (step 308), and can prevent increases of the SINR set point if the receiver's front end is close to saturation (step 310). For example, the power control law that can be used by one or more transmitting nodes may be expressed as:

$$SINR^*_{ij}(k+1) = \begin{cases} f(C^*_{ij}), & P_j^T \geq P_j^{sat} - \delta P \\ SINR^*_{ij}(k), & \text{otherwise} \end{cases}$$

where $\delta P$ is a margin value provided for link safety purposes (e.g., to prevent a link outage due to a sudden increase of signal magnitude during emergence from a deep fade).

Next, for some example embodiments, the one or more transmitting nodes 104, 106, 108, 110, 112, 114 in FIG. 1 can execute another power control law that sets the SINR set point value proportional to the difference between the saturation power and total received power (step 312). In other words, for distributed outer loop power control, all of the pertinent power control functions are performed at the one or more transmitting nodes. For example, this power control law may be expressed as:

$$SINR^*_{ij}(k+1) = SINR^*_{ij}(k) + \alpha_i(P_j^{sat} - P_j^T)$$

Note that, for some example embodiments, the saturation value here is the actual saturation power, $P^{sat}$, minus a predetermined safety margin. This step can be provided to ensure that the SINR set point values for the different nodes involved (e.g., different due to different proportionality constants $\alpha_i$, with the sum of all of them being unity) can be increased to allow more traffic per node when the interference at a receiving node is relatively low, and the traffic per node can be decreased when the interference at the receiving node has increased. Notably, this novel technique can also distribute the remaining capacity proportionally between the different transmitting nodes that are linked communicatively to the determining/receiving node involved.

At this point, since the relative needs of the different nodes in the network can be known a priori, then the determining node can also distribute the derived capacity information a priori to the transmitting nodes so that the sum of their transmitted powers received at the receiving node equals the saturation power of that node (e.g., with or without a margin of safety provided). As such, the received power of node i at node j can be represented by the expression:

$$P_{ij}^r(k) = P_j^T(k) SINR_{ij}(k)$$

From this received power value, the channel gain $\beta_{ij}(k)$ value at that time can be immediately obtained from the ratio of the received power $P_{ij}^r(k)$ to the transmitted power $P_{ij}(k)$. This channel gain value can be used by the network to adapt the power control law to provide faster mobility of the radios involved (instead of, for example, using the adaptive law disclosed in the '383 application), and also obtain the maximum transmit power possible (i.e., the maximum received power):

$$P_{ij,max}^r = SINR_{ij}^* P_j^{sat}$$

$$P_{ij,max}^t(k) = \frac{P_{ij}^r, \max}{\beta_{ij}(k)}$$

provided that the sum of the SINR values is less than 1 (e.g., less than 1.0 minus the noise power/total received power).

It is important to note that while the present invention has been described in the context of a fully functioning wireless communication network, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular wireless communication network.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method for performing distributed outer loop power control in a wireless communication network, comprising the steps of:
    determining a transmit power for a plurality of transmitting nodes such that signals sent from each of the transmitting nodes are received at a receiver associated with a receiving node at a predetermined signal-to-interference plus noise ratio (SINR) set point;
    increasing the SINR set point at the receiving node of one or more transmitting nodes of the plurality of transmitting nodes if a total received power at a front end of the receiver associated with the receiving node is below a saturation power of the receiver minus a safety margin; and
    decreasing the SINR set point at the receiving node of the one or more transmitting nodes of the plurality of transmitting nodes if the total received power at the front end of the receiver associated with the receiving node is within the safety margin of the saturation power of the receiver.

2. The method of claim 1, wherein the determining step further comprises a step of:
    determining a goodput value for a plurality of communication links in the wireless communication network; and
    determining a SINR set point value for each communication link of the plurality of communication links.

3. The method of claim 1, wherein the determining step further comprises a step of:
    determining a goodput value for a plurality of communication links in the wireless communication network; and
    determining a SINR set point value for each communication link of the plurality of communication links based on the goodput values.

4. The method of claim 1, wherein the determining step further comprises a step of:
    determining a frame error rate value for a plurality of communication links in the wireless communication network; and
    determining a SINR set point value for each communication link of the plurality of communication links based on the frame error rate values.

5. The method of claim 1, wherein at least one of the increasing step and decreasing step comprises a step of:
    providing feedback to the one or more transmitting nodes of the plurality of transmitting nodes including at least one of a total receive power value, a saturation power value, and a SINR value.

6. The method of claim 1, wherein at least one of the increasing step and decreasing step comprises the steps of:
    setting a SINR set point value proportional to a difference between a receive saturation power value and a total receive power at the one or more transmitting nodes of the plurality of transmitting nodes.

7. The method of claim 1, wherein the steps are performed by a processor unit associated with the one or more transmitting nodes, and the one or more transmitting nodes are one or more cellular radiotelephones.

8. The method of claim 1, further comprising the steps of:
    a priori distributing a predetermined capacity associated with the one or more transmitting nodes of the plurality of transmitting nodes such that a sum of a plurality of power values at a receiver associated with a receiving node is substantially equal to a predetermined saturation power for the receiver.

9. The method of claim 1, further comprising the steps of:
    determining a received power level for a transmitting node i at a receiving node j;
    determining a channel gain associated with the received power level; and
    determining a maximum transmit power value possible for the transmitting node i.

10. The method of claim 1, further comprising the steps of:
    determining a received power level for a transmitting node i at a receiving node j;
    determining a channel gain associated with the received power level, whereby the channel gain is associated with a ratio of the received power level to a transmitted power level; and
    determining a maximum transmit power value possible for the transmitting node i.

11. A method for performing distributed outer loop power control in a cellular communication network, comprising the steps of:
    determining a transmit power for a plurality of mobile units such that signals sent from each of the mobile units are received at a receiver associated with a base station at a predetermined signal-to-interference plus noise ratio (SINR) set point;
    increasing the SINR set point at the base station receiver of one or more of the mobile units if a total received power at a front end of the base station receiver is below a saturation power of the receiver minus a safety margin; and
    decreasing the SINR set point at the base station receiver if the saturation value for the front end of the base station receiver is within the safety margin of the saturation power of the receiver.

12. The method of claim 11, wherein the determining step further comprises a step of:
    determining a goodput value for a plurality of one-hop communication links in the cellular communication network; and
    determining a SINR set point value for each one-hop communication link.

13. A wireless communication system, comprising:
    a plurality of nodes including at least one receiving node and a plurality of transmitting nodes, each transmitting node of the plurality of transmitting nodes communicatively coupled to the at least one receiving node, wherein the at least one receiving node is configured to:
    receive a signal transmitted by at least one transmitting node of the plurality of transmitting nodes; and
    the at least one transmitting node of the plurality of transmitting nodes is configured to:
    determine a transmit power such that signals sent from the at least one transmitting node is received at the at least one receiving node at a predetermined SINR set point;
    increase the SINR set point at the at least one receiving node if a total received power at a front end of the receiver associated with the receiving node is below a saturation power of the receiver minus a safety margin; and
    decrease the SINR set point at the at least one receiving node if the total received power at the front end of the receiver associated with the receiving node is within the safety margin of the saturation power of the receiver.

14. The wireless communication system of claim 13, wherein the at least one receiving node is further configured to:

determine a goodput value for a plurality of communication links in a network associated with the wireless communication system; and determine a SINR set point value for each communication link of the plurality of communication links.

15. The wireless communication system of claim 13, wherein the at least one receiving node is further configured to:

determine a goodput value for a plurality of communication links in a network associated with the wireless communication system; and determine a SINR set point value for each communication link of the plurality of communication links based on the goodput values.

16. The wireless communication system of claim 13, wherein the at least one receiving node is further configured to:

determine a frame error rate value for a plurality of communication links in a network associated with the wireless communication system; and determine a SINR set point value for each communication link of the plurality of communication links based on the frame error rate values.

17. The wireless communication system of claim 13, wherein the at least one receiving node is further configured to:

provide feedback to the at least one transmitting node of the plurality of transmitting nodes including at least one of a total receive power value, a saturation power value, and a SINR value.

18. The wireless communication system of claim 13, wherein at least one transmitting node is further configured to:

set a SINR set point value proportional to a difference between a receive saturation power value and a total receive power.

19. The wireless communication system of claim 13, wherein the at least one receiving node includes a receiver and a processor unit associated with a base station, and the plurality of transmitting nodes is a plurality of cellular mobile or fixed radiotelephones.

20. The wireless communication system of claim 13, wherein the system includes a cellular network operated in accordance with a spread spectrum communication network protocol.

\* \* \* \* \*